United States Patent
Katsube et al.

(10) Patent No.: US 8,139,551 B2
(45) Date of Patent: Mar. 20, 2012

(54) QUALITY OF SERVICE (QOS) ASSURANCE SYSTEM USING DATA TRANSMISSION CONTROL

(75) Inventors: Yasuhiro Katsube, Franklin Lakes, NJ (US); Shinichi Baba, Irvine, AZ (US); Farooq M Anjum, Somerset, NJ (US); Moncef Elaoud, Lake Hopatcong, NJ (US)

(73) Assignees: Toshiba America Research, Inc., Morristown, NJ (US); Telcordia Technologies, Inc., Piscataway, NJ (US)

( * ) Notice: Subject to any disclaimer, the term of this patent is extended or adjusted under 35 U.S.C. 154(b) by 2861 days.

(21) Appl. No.: 10/444,953

(22) Filed: May 27, 2003

(65) Prior Publication Data
US 2004/0095914 A1 May 20, 2004

Related U.S. Application Data

(60) Provisional application No. 60/427,186, filed on Nov. 19, 2002.

(51) Int. Cl.
*H04W 4/00* (2009.01)
*H04L 12/26* (2006.01)
*H04B 7/00* (2006.01)

(52) U.S. Cl. ...... 370/338; 370/235; 370/230; 370/310.2

(58) Field of Classification Search .................. 370/230, 370/338
See application file for complete search history.

(56) References Cited

U.S. PATENT DOCUMENTS

| 4,439,432 A | 3/1984 | Peat |
| 6,580,700 B1 | 6/2003 | Pinard et al. |
| 7,149,184 B2 * | 12/2006 | Takada et al. ................. 370/230 |
| 7,333,434 B2 * | 2/2008 | Grenot et al. ................. 370/235 |
| 2002/0095498 A1 * | 7/2002 | Chanda et al. ................ 709/225 |

FOREIGN PATENT DOCUMENTS

JP 2000-209234 A 7/2000
WO WO 0207388 A2 * 1/2002

OTHER PUBLICATIONS

ANSI/IEEE Std 802.11-1999 Reaffirmed Jun. 12, 2003 pp. 3 & 39.*
Internet Printout: http://www.w3.org/TR/1999/REC-xpath-19991116—XML Path Language (XPath), dated Oct. 25, 2004.
Internet Printout: http://www.w3.org./TR/xmlschema-1/—XML Schema Part 1: Structures, dated Oct. 25, 2004.
Notification of Reasons for Rejection mailed Sep. 25, 2007 in Japanese Application No. JP2003-389375 and English translation thereof.

* cited by examiner

*Primary Examiner* — Matthew Sams
(74) *Attorney, Agent, or Firm* — Banner & Witcoff, Ltd.

(57) ABSTRACT

The present invention provides improved quality of service through data transmission rate control in a network. Data rate control may be in the downlink or uplink direction and may be statically or dynamically configured. Rate control may be implemented at varying points in the network including but not limited to at the wireless host, at the access point, at a separate device such as a server or at a separate location within the network. In one example of the present invention, a rate enforcement function is provided for identifying data packets to be enforced or identifying mapping between each packet and corresponding access point. Also, a rate decision function is also provided for determining the data rate to be enforced for each of the access points or each of the wireless hosts.

30 Claims, 16 Drawing Sheets

QUALITY OF SERVICE (QOS) ASSURANCE SYSTEM USING DATA TRANSMISSION CONTROL

This application claims the benefit of U.S. Provisional Application No. 60/427,186, filed Nov. 19, 2002, incorporated herein in its entirety.

TECHNICAL FIELD

The present invention relates to a method and system for managing network resources and, in particular, providing quality of service (QoS) for applications including voice and data in wireless LAN systems.

BACKGROUND

Local Area Networks (LANs) have been in existence for over 30 years. They are widely used in universities, enterprises and government offices. While LANs in the past have operated over wired media, lately we have been witnessing a boom in the deployment and usage of Wireless Local Area Networks (WLANs). Once only seen within large enterprises, WLANs are increasingly making their way into residential, commercial, industrial and public deployments. Recent efforts by telephone carriers to integrate LANs and WLANs into their wide-area service offerings are testimony to their growing role in the future of networking.

Voice continues to be the most predominant wireless application and in order to fully integrate with existing and future cellular systems both LANs and WLANs must deliver high quality voice service. In addition to voice services, carriers plan to offer other services such as video conferencing and data services such as Internet access.

FIG. 1 illustrates a typical wireless LAN environment. In a typical wireless LAN environment, data traffic such as Web browsing or FTP is predominantly in the downstream direction (i.e., from the Access Point 101 to the host 102 or 103) with only minimal data traffic in the upstream direction (i.e., from the host 102, 103 to the Access Point 101). Data transmission in the downstream typically predominates because users typically receive far more data than they send. However, data transmission in the upstream direction may include a user sending a large file via e-mail or via FTP to other users that are connected to the network. In theory, if the number of users sending large files in this way is large, the amount of data sent in the upstream direction may increase. However, typically, the amount of data sent in the upstream direction is much less than data sent in the downstream direction. As illustrated in FIG. 1, downstream data transmission is much greater than upstream data.

Voice transmission, on the other hand, is typically approximately the same in both downstream and upstream directions. However, because data transmission predominates over voice transmission in terms of bandwidth and most data transmission is in the downstream direction, the downstream data transmission may contend with and cause voice quality-of-service degradation. The downstream data transmission may not only interrupt downstream voice transmission at the access point locally but also may contend with the upstream voice transmission as well. Likewise, upstream data transmission, although typically less than downstream data transmission, may also interrupt upstream voice transmission locally at the host as well and contend with voice transmission in both directions. Finally, voice transmission may compete for resources from itself. For example, the upstream voice transmission may compete with downstream voice transmission.

Attempts have been made to resolve the problem of shared media taking quality of service into account. However, no satisfactory solution has been found to date. One method of dealing with the problem involves priority control of the shared media. In this method, a higher priority is assigned to voice transmission and a lower priority is assigned to data transmission. A separate queue is implemented in an access point for voice and for data with a higher priority assigned to the voice data queue. In this way, voice packets are transmitted over data packets if voice packets are in the queue. However, this priority control alone is not enough to avoid the effect of contention between distinct wireless nodes (access points and hosts) for shared wireless resources.

Currently, wireless LANs and most vendors do not provide satisfactory QoS function. With the prior art method, redesign of the access points and upgrading the hardware is necessary as well as changes in the access protocol for implementation. The IEEE 802.11 committee is working on the new standard for the access protocol to provide QoS over wireless LAN environment, which will also require hardware or firmware changes for implementation. This has proven to be problematic for users due to inconvenience and cost, for example.

Thus, a need exists in the art for better quality voice transmission, improved quality of service function (QoS) or better quality video or stream-based applications, for example, without changing the access protocol or the access point itself.

SUMMARY

A system, method and apparatus are provided for improving quality of service in a network. In particular, the present invention provides improved quality of service for voice transmission (or any other type of packet stream that needs certain quality) in a network. The network may be, for example, a wireless LAN environment.

In one example, a network is provided with a rate enforcement function connected to a plurality of access points in a network for controlling a transmission rate of traffic to be enforced (e.g., typically, a rate of data traffic). The rate enforcement function may receive rate enforcement parameters corresponding to an access point in the network from a rate determining function. The enforced rate information may be sent to the access point and the access point may transmit enforced packets at a rate corresponding to the transmission rate given by the rate enforcement function.

In another example, enforced packets may be received at the rate enforcement function and the packets may be classified as enforced or non-enforced. For example, the rate enforcement function may contain a QoS classification table, which may contain a list of enforced or non-enforced information and corresponding address information for each packet. The address information may correspond to a host or wireless host, for example. The classified data packet may be sent to an access point identification module where an access point corresponding to the packet may be identified. In this example, an access point identification table may be used which contains mapping information between a host or wireless host device (e.g., identification information including but not limited to IP address or MAC address) and corresponding access point identification. The access point identification may include, for example, a unique number or identifier associated with the access point or the access point's MAC address.

The enforced packet (e.g., data packet) may then be sent to a rate enforcer device for determining the rate of transmission of the packet for the associated access point. Packet transmission rate information may be received from a rate decision function. In one example, the rate decision function may determine the enforced rate parameters based on access point information, wireless host information or other information received (e.g., the number of wireless hosts, the number of voice sessions, or the amount of voice packets). The information may be received from a variety of sources including but not limited to the rate enforcement function, a wireless host, an access point, a server or a dedicated management entity. The information may include voice session control information, for example.

The data transmission in the downstream or downlink direction typically exceeds data transmission in the upstream or uplink direction. Thus, data transmission in the downstream or downlink direction may contend with voice, video or stream-based transmissions. If upstream data transmission increases, then upstream data transmission may likewise contend with voice, video or stream-based transmission and thus impact quality of service. The present invention provides a novel system, method and apparatus for data rate control in either or both directions to improve quality of service for voice transmission, for example, in a wireless LAN environment. Although data traffic is the most typical application to be enforced and voice traffic is the most typical application to be given better QoS (non-enforced), any other applications can be enforced or any other application can be given better QoS with this invention by just changing rules of packet classification, for example.

DETAILED DESCRIPTION OF THE DRAWINGS

The present invention provides a system and method for providing improved QoS for voice transmission or other transmission such as video or stream-based applications, for example, in a network. The present invention is applicable to voice transmission in a wireless LAN, for example, where voice transmission may contend with data transmission in both the upstream and downstream directions.

In one embodiment, data transmission, particularly data transmission in the downstream direction, is dominant. Therefore, restricting the data rate such that voice transmission is provided with adequate wireless bandwidth may provide increased QoS for voice transmission. Rate control of data transmission may be accomplished in a variety of ways. Because downstream data transmission is predominant, the downstream data rate may be controlled. Likewise, if upstream data becomes significant, the upstream data rate may also be controlled. However, data transmission in either direction (i.e., downstream or upstream) may be controlled such that voice transmission does not negatively contend with data transmission. Data traffic such as Web browsing or FTP is considered the most typical example of enforced traffic, and voice traffic is considered the most typical example of non-enforced traffic (traffic that is given improved QoS), any other type of traffic can be enforced or can be given improved QoS by changing packet classification policy without changing the idea of this invention.

Rate control may be accomplished at various points throughout the network which may depend if data transmission in the upstream or downstream direction is desired. For example, upstream rate control may be accomplished at the host and downstream rate control may be accomplished at the access point or a dedicated apparatus for rate control which may be connected to the access point, connected to a switch, or anywhere in the network.

Likewise, rate control may be accomplished with a static or dynamic configuration. In a static configuration, the rate may be fixed at a desired level. For example, a wireless host may manually configure or negotiate the uplink data rate when the wireless host is connected to the wireless network based on configuration data. In a dynamic configuration, the rate is variable and changes based on various requirements. For example, if the number of voice sessions is large or if the amount of voice packets to be transmitted is large or depending on the QoS status of the voice packets, the data rate may be adjusted accordingly.

Figure 1:
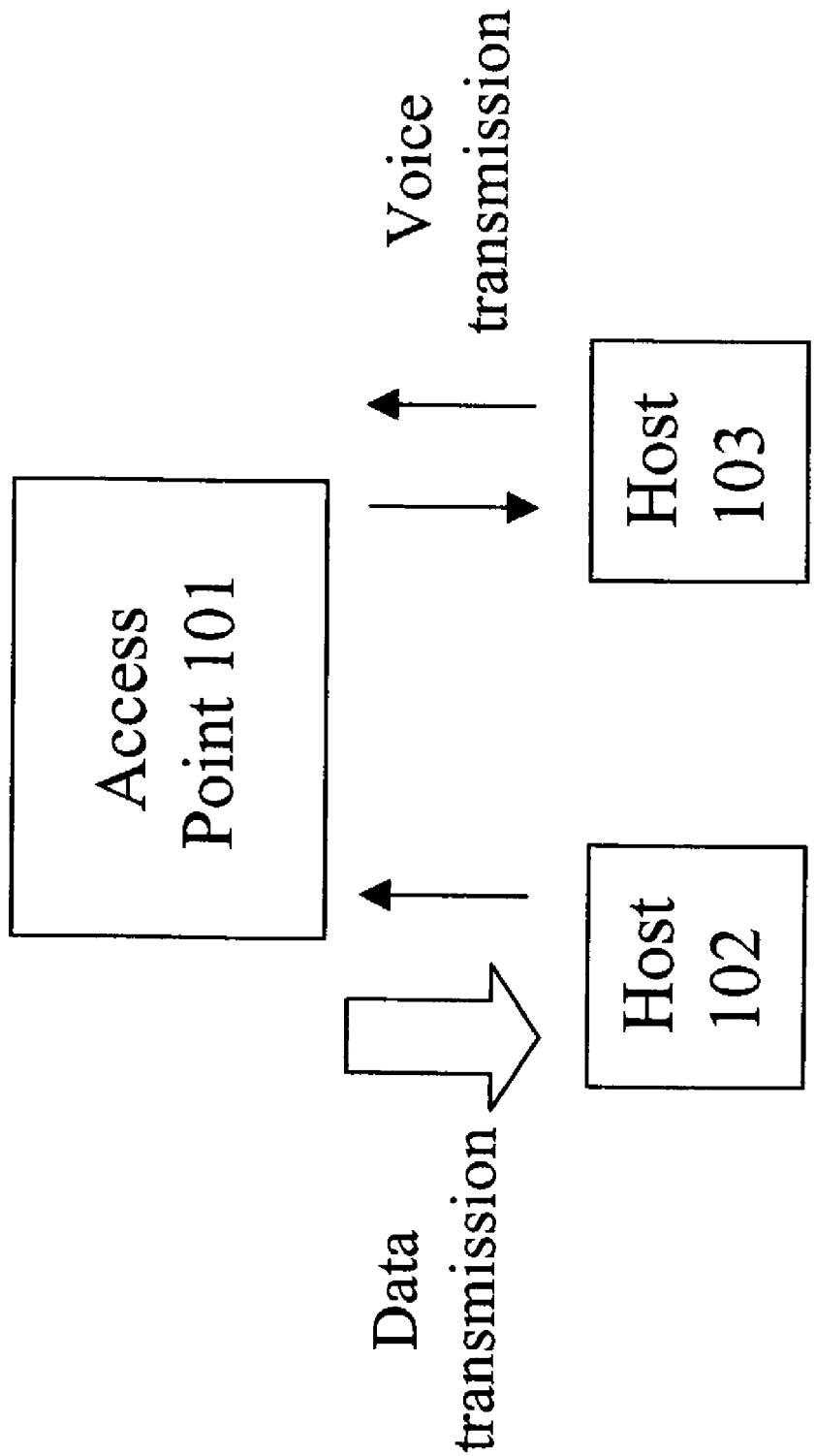
FIG. 1 shows an example of a typical wireless LAN network.
Figure 2:
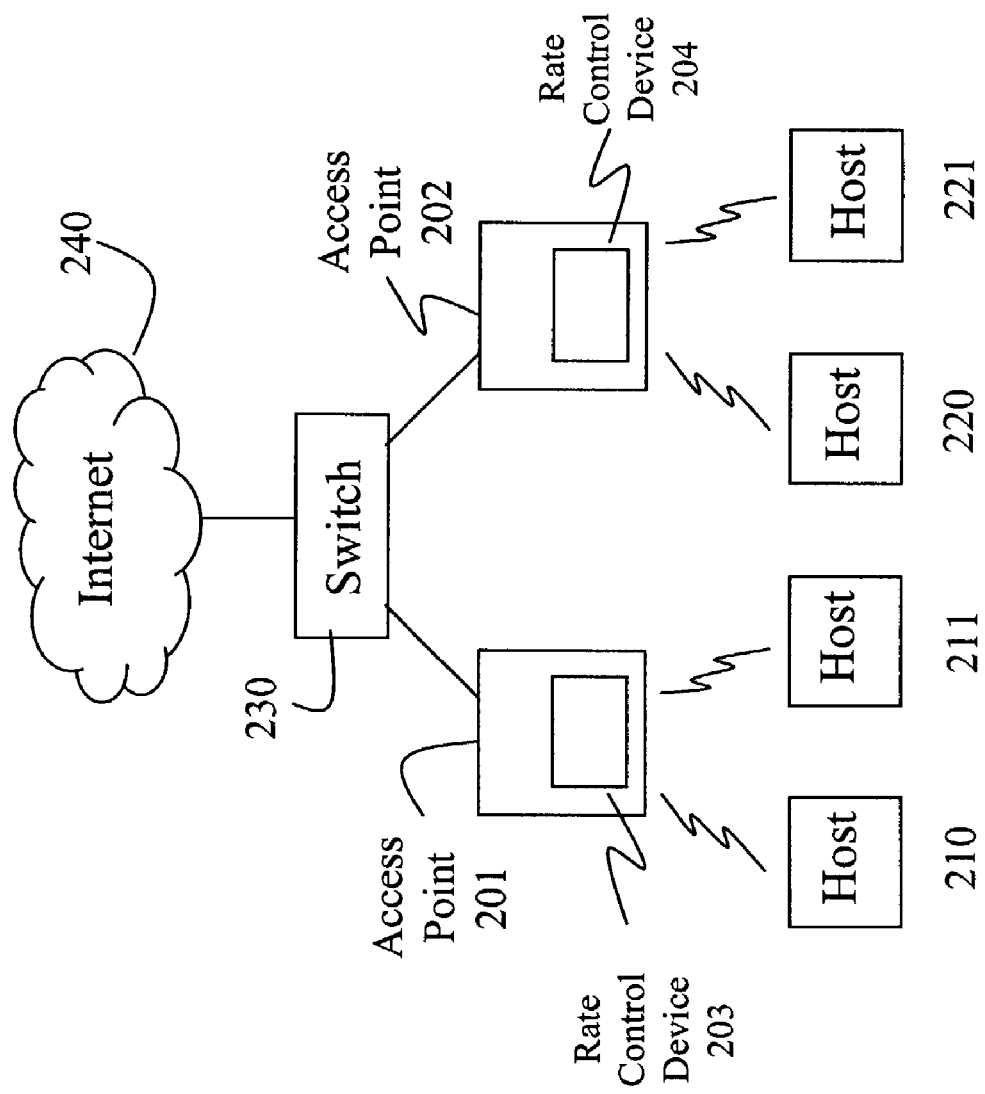
FIG. 2 shows an example of a wireless LAN network in accordance with aspects of the present invention.

Rate control may be imposed at various points in the network. FIG. 2 illustrates an example of a wireless LAN network where the rate control is implemented at the Access Point 201, 202. In this example, controlling or throttling the data traffic is performed at the access point 201, 202. A rate control device 203 may be co-located at the access point 201 and a rate control device 204 may be co-located at the access point 202. Each of the access points 201, 202 are in communication with respective hosts. For example, access point 201 may be in communication with hosts 210, 211 and access point 202 may be in communication with hosts 220, 221. A switch 230 may be connected upstream from the access points 201, 202. The switch 230 may be a layer 2 switch, for example, and may interface the access points 201, 202 with a backbone network such as the internet 240. In this example, each rate control device 203, 204 is associated with a respective access point 201, 202 and may control a corresponding host.

Figure 3:
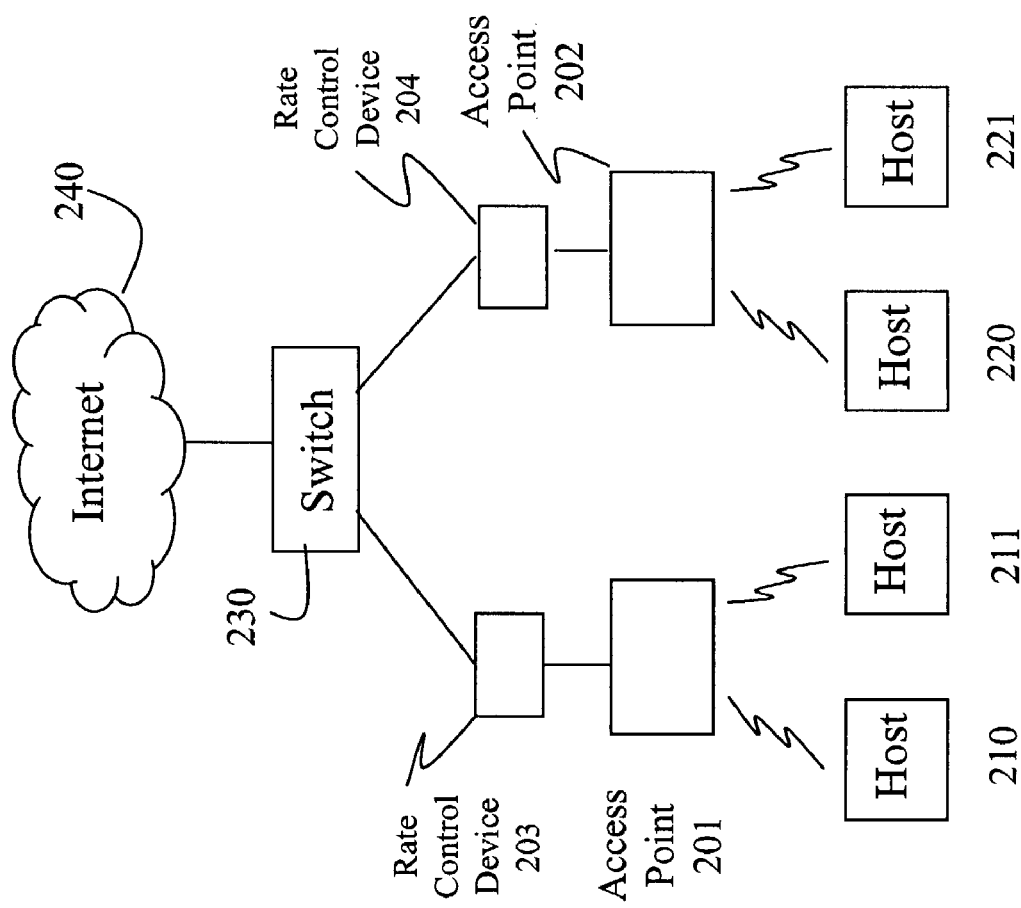
FIG. 3 shows an example of a wireless LAN network in accordance with aspects of the present invention.

FIG. 3 illustrates another example of a wireless LAN network where rate control or throttling of the data traffic is performed upstream from the Access Points 201, 202. In this example, data rate control or throttling of the data traffic is performed by a rate control device 203, 204 corresponding to an access point 201, 202 between a switch 230 (e.g., a layer 2 switch) and the access point 201, 202. Further in this example, each rate control device 203, 204 is dedicated to a particular access point 201, 202 such that each rate control device controls the data rate of one access point 201 or 202.

Figure 4:
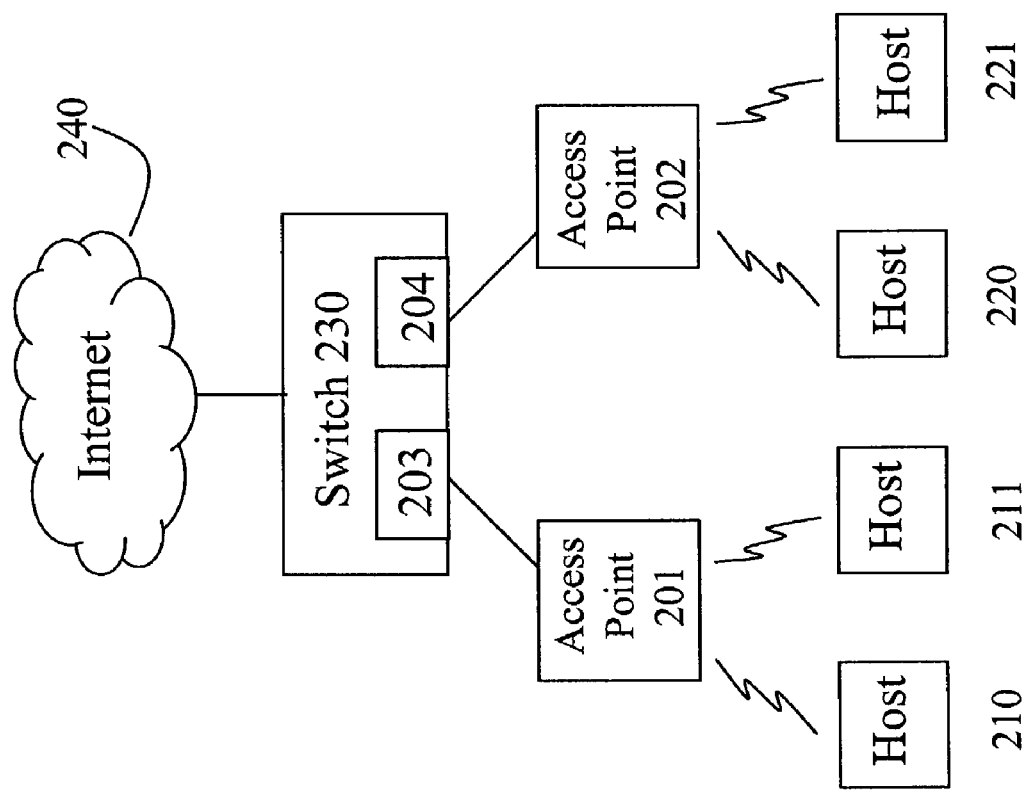
FIG. 4 shows an example of a wireless LAN network in accordance with aspects of the present invention.

FIG. 4 illustrates another example of a wireless LAN network where rate control is integrated into the switch 230 (e.g., a layer 2 switch). FIG. 4 illustrates each rate control device 203 and 204 co-located with the switch 230 and dedicated to and controlling a single access point 201 and 202, respectively.

Figure 5:
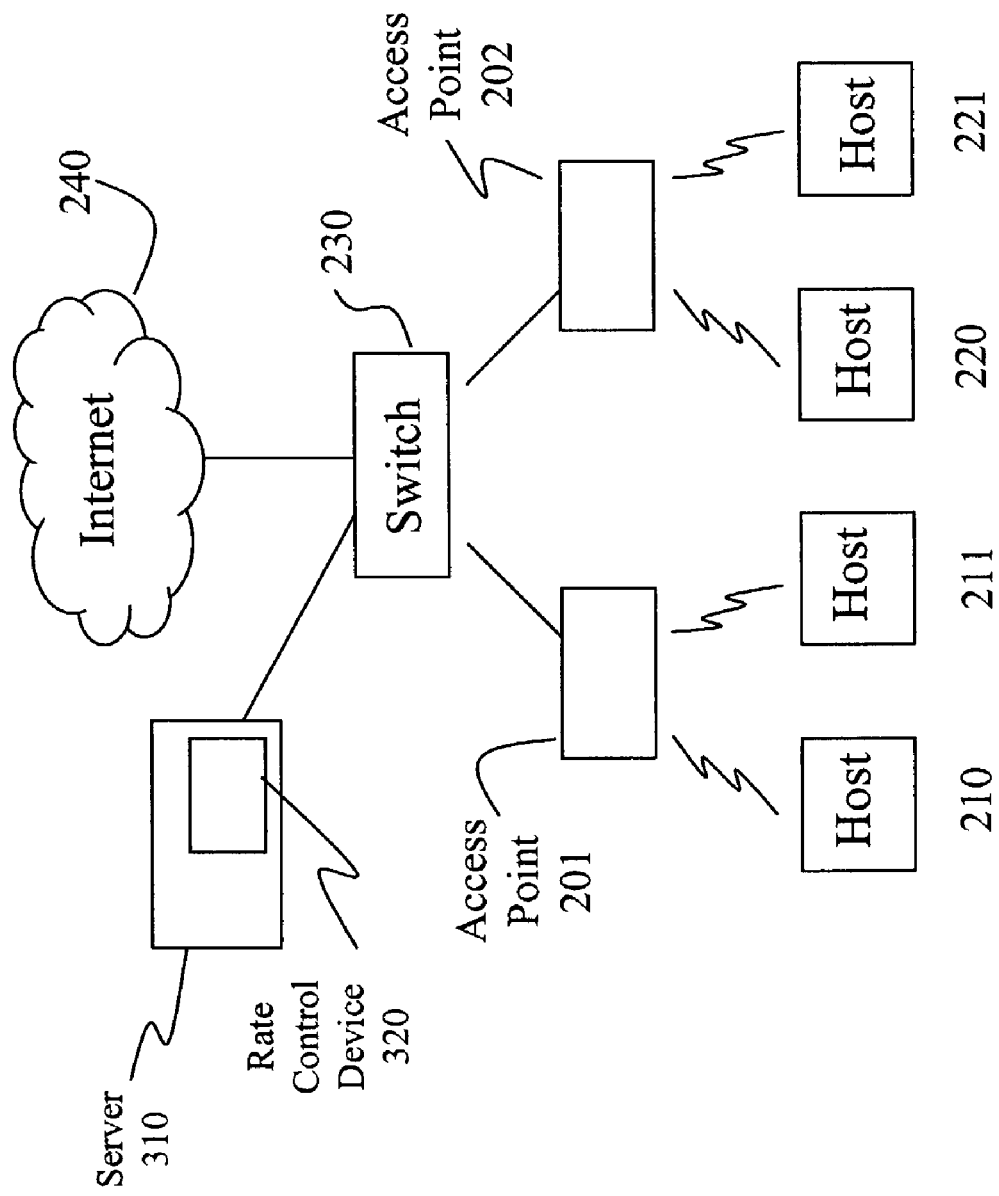
FIG. 5 shows an example of a wireless LAN network in accordance with aspects of the present invention.

FIG. 5 illustrates another example of a wireless LAN network where rate control functionality is provided as a separate entity. As FIG. 5 illustrates, rate control functionality may be provided in a server or controller 310. In this example, data is transmitted to the rate control device 320 and the rate control device 320 may transmit the data traffic to access points 201, 202. This transmission of data traffic may be based on specified restricted data rates for each access point 201, 202. As an illustration, a user may use a mobile IP and a data packet may be transmitted to the location of the mobile user. A data packet may be encapsulated by an IP header and sent to the rate control device 320. The rate control device 320 may decapsulate the outer IP header and send the data to the target destination. Thus, in this example, a data packet is received at the rate control device 320, then distributed to each host 210, 211, 220, 221 via a corresponding access point 201, 202. The rate control device 320 may be co-located with the server 310 which may be upstream from a switch 230 (e.g., a layer 2 switch).

Figure 6:
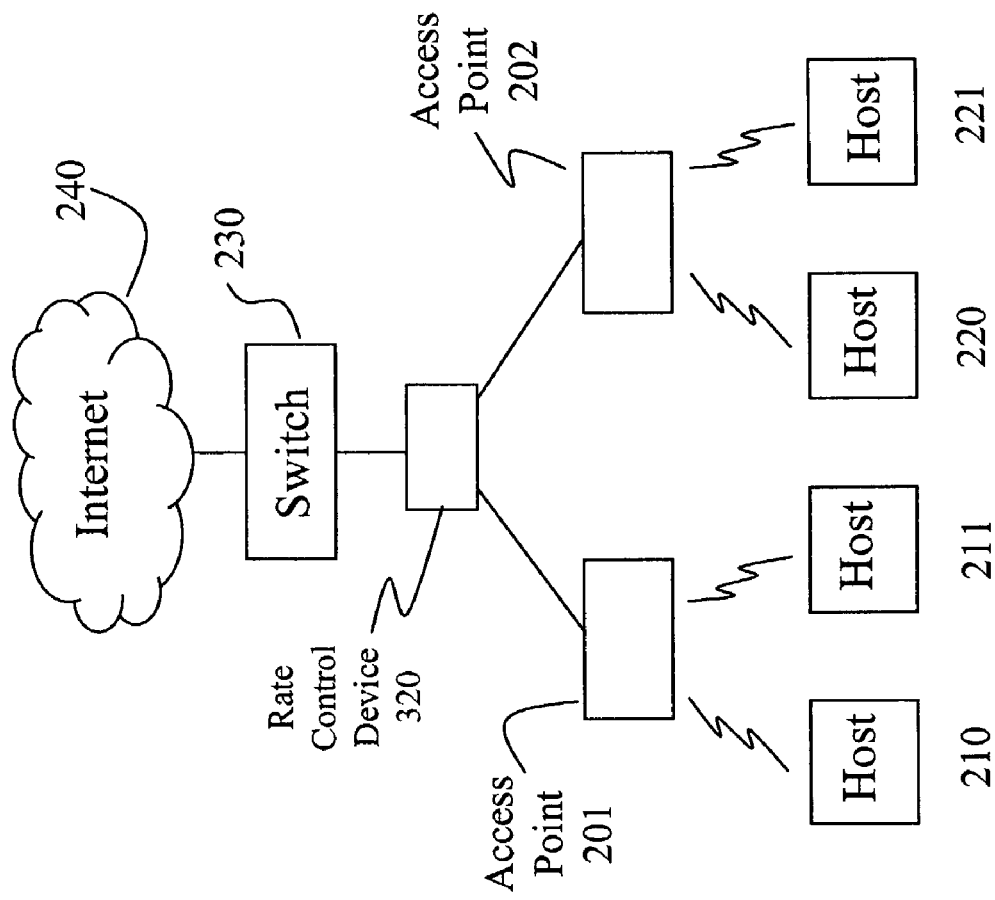
FIG. 6 shows an example of a wireless LAN network in accordance with aspects of the present invention.

FIG. 6 illustrates another example of a rate control device 320 in a wireless LAN network. In this example, the rate control device 320 is located at a point to handle multiple access points 201, 202. Thus, one rate control device 320 can provide data rate control functionality for a number of access points 201, 202. Further in this example, a switch such as a layer 2 switch or Ethernet switch 230, may be located between the rate control device 320 and the a backbone network such as the Internet 240. The rate control device 320 may provide layer 2 switch functionality itself. In this example, a rate control device 320 may be utilized without altering the currently available network environment and without making changes to the access points 201, 202.

The rate control device 320 may contain a rate enforcement function (REF) for implementing data rate control. In addition, rate control device 320 may include a rate decision function (RDF) for controlling and managing the rate control function. For example, the rate decision function (RDF) may determine the data rate and may provide data rate information to the rate enforcement function (REF). Further, the rate decision function (RDF) may dynamically determine the data rate to be enforced for each access point. In this way, the data rate for an access point may be determined for the present conditions.

Figure 7:
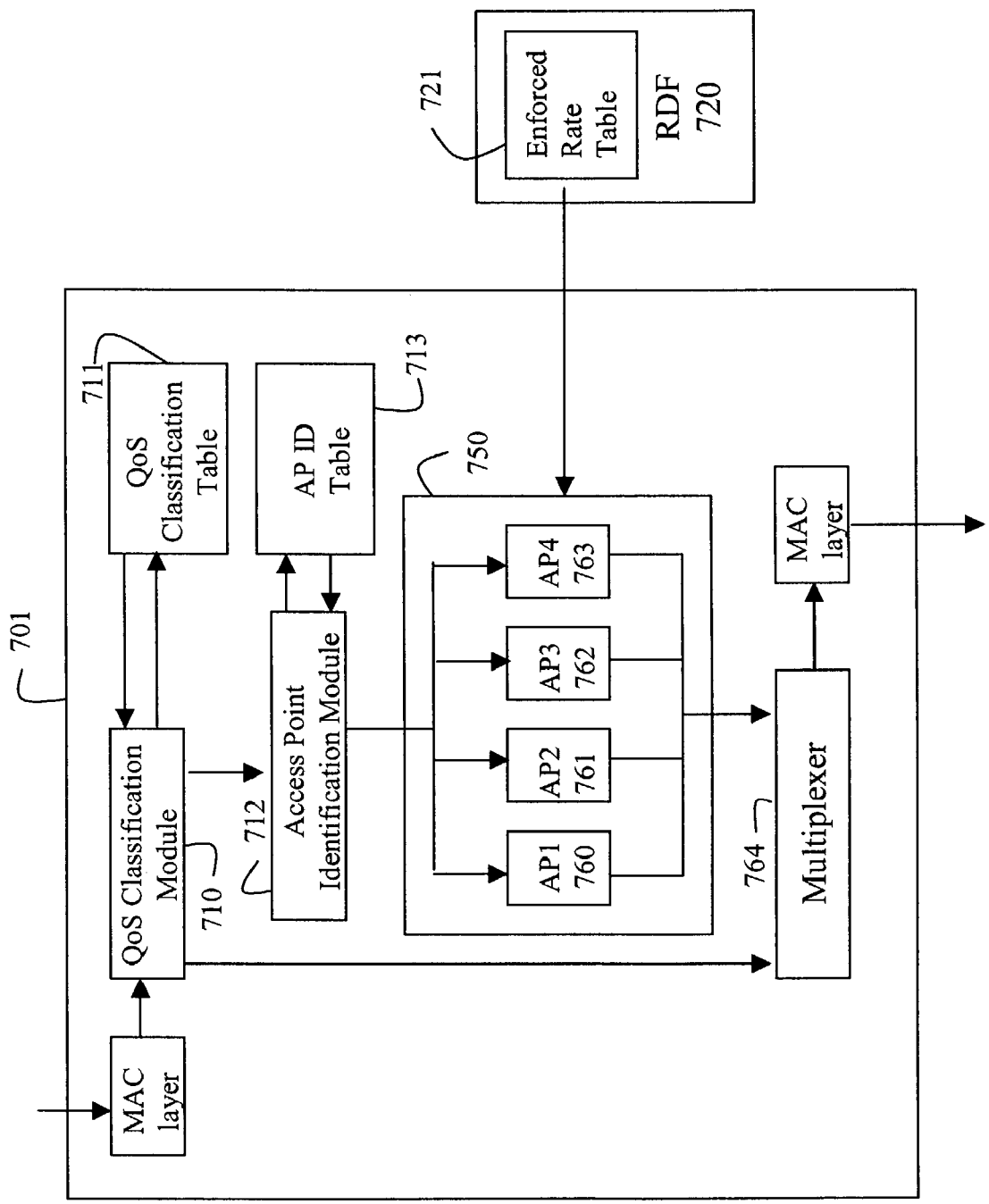
FIG. 7 shows an example of a Rate Enforcement Function (REF) and Rate Decision Function (RDF) in accordance with aspects of the present invention.

The RDF may control the REF by providing information relevant to the REF and the information may include information regarding the preferable data rate for each access point. FIG. 7 illustrates an example of a Rate Enforcement Function (REF) 701 and Rate Decision Function (RDF) 720.

The REF 701 may receive a data packet which is sent to the QoS classification module 710. A QoS classification module 710 interacts with the QoS classification table 711 to classify the data packets as an enforced data packet or a non-enforced data packet.

Figure 8:
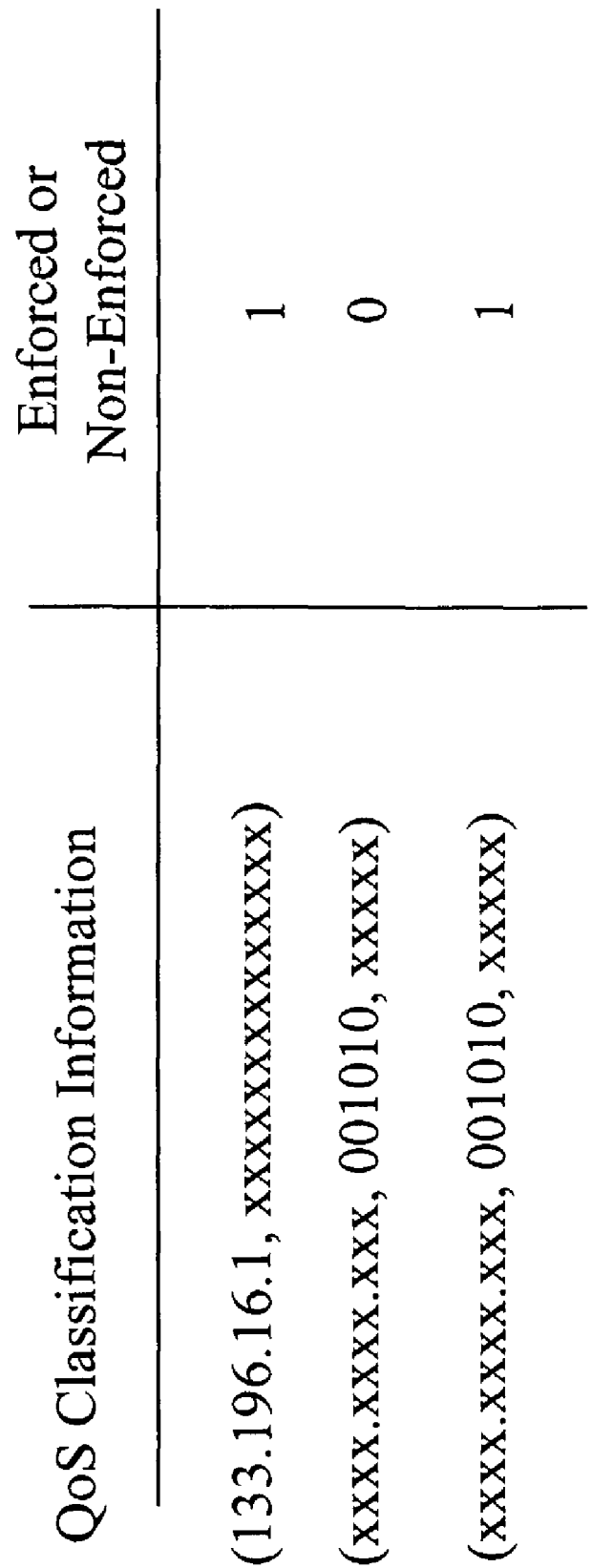
FIG. 8 shows an example of a QoS classification table in accordance with aspects of the present invention.

The QoS classification table 711 may take many forms and may include a variety of elements. FIG. 8 illustrates one example of a QoS classification table. During QoS classification, individual packets may be classified as either enforced or non-enforced based on any number of parameters. In one example, TCP packets (e.g., data packets such as web browsing or FTP) may be classified as enforced while other packets are designated as non-enforced. In this example, the QoS classification table may have a key entry based on the header information. For example, the header information may include the IP address or TOS (Type of Service) bit or DSCP (Differentiated Services Code Point). This information at each node can identify the classification of service information or quality of service information that should be given to each packet. Alternatively, higher layer information may be used. An example of higher layer information includes a protocol field, TCP header, UDP header or lower layer information such as a MAC header, layer 2 header. However, the QoS classification is not so limited. For example, the header information may also have information from different layers such as, for example, layer 2, layer 3, or layer 4. Thus, classification of the packet as enforced or non-enforced may be determined from information in the packet header.

QoS classification information may be manually configured or dynamically established by QoS management protocols. Examples of such protocols include but are not limited to RSVP (Resource Reservation Protocol) or SLA (Service Level Agreement) negotiation protocol.

The REF 701 illustrated in FIG. 7 may further contain an AP (Access Point) identification module 712 for identifying the access point for transmission of the data (=enforced) packet. For example, a destination IP address or MAC address information may be provided. The destination address in the packet header may provide the destination address information and the access point may be assigned a number or identifier or a global unique MAC address such that the access point may be indicated as the destination access point of a packet. An AP identification table 713 may be connected to the AP identification module 712 for providing access point identification for the packet.

Figure 9:
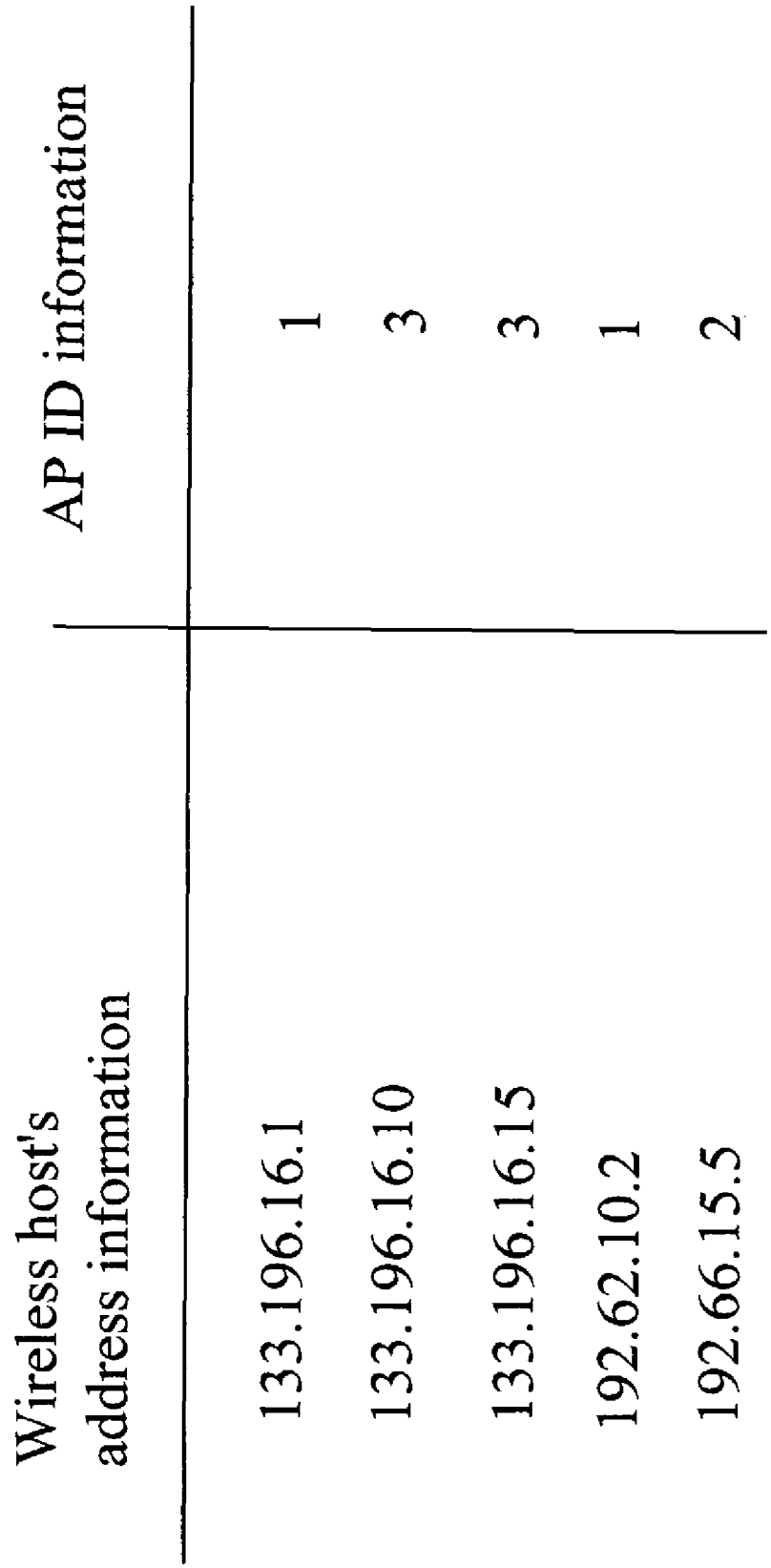
FIG. 9 shows an example of an Access Point identification table in accordance with aspects of the present invention

FIG. 9 illustrates an example of an AP identification table 713 associated with the AP Identification module 712. When a packet is classified as enforced or non-enforced, the target destination of the packet is examined. FIG. 9 illustrates an example of an AP identification table 713 containing destination address information for each packet. For example, an IP address or a MAC/layer 2 address may be used to identify the access point. The AP identification table 713 may contain the wireless host's address information associated with an identifier of a corresponding access point (i.e., AP identification information). The AP identification information may be any identifier of an access point. As FIG. 9 illustrates, the AP identification information may be a unique number or a MAC address corresponding to the access point.

Figure 10:
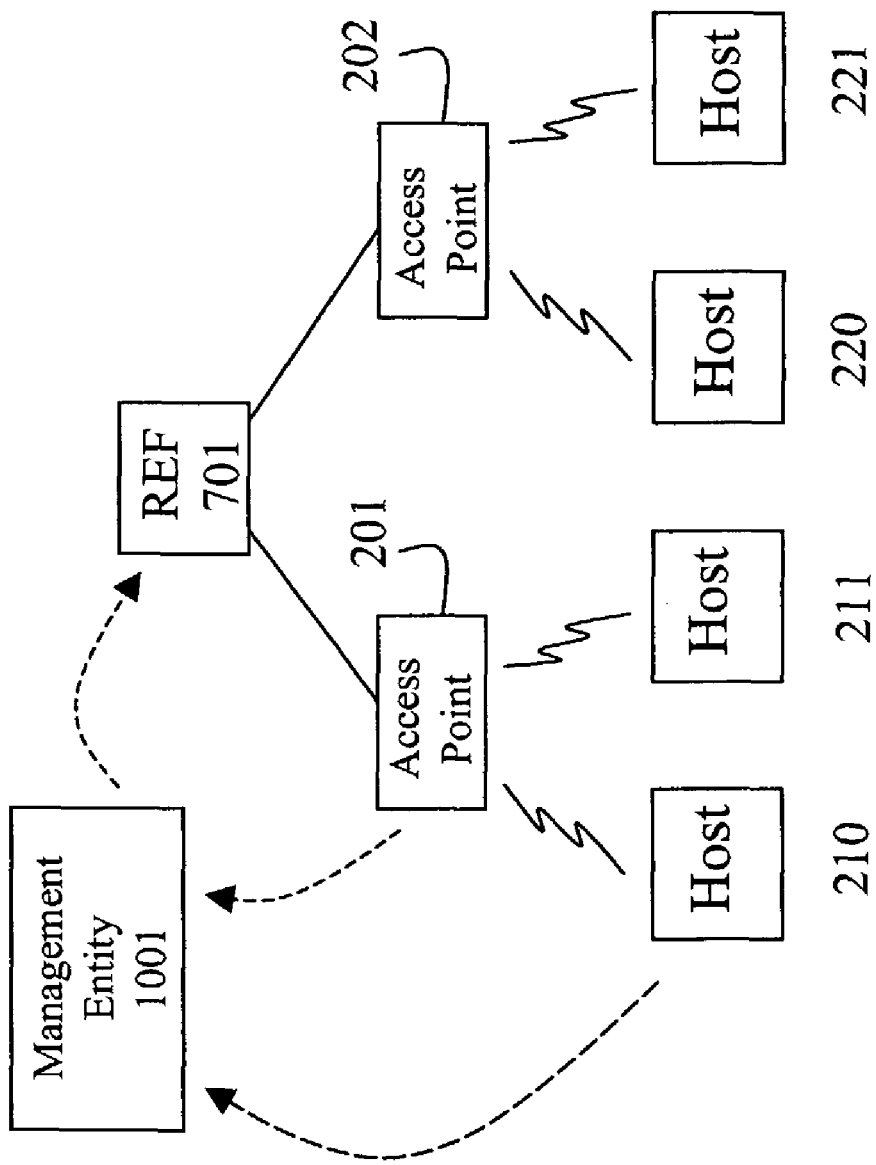
FIG. 10 shows and example of a management entity in accordance with aspects of the present invention.

Thus, the REF 701 may contain mapping information of the relationship between a wireless host address such as an IP address or MAC address and access point identification information such as an Access point ID number or a MAC address of the access point. There are many ways in which the mapping relationship may be established. For example, the wireless host may notify the REF 701 of its address and the associated access point identification information when the wireless host recognizes an access point with which to be connected. Also, the access point may notify the REF 701 of the mapping information. Alternatively, a separate module such as a management entity may be used such that a wireless host or an access point may notify the separate module (e.g., the management entity) of associated mapping information. The separate module may then notify REF 701 of the mapping information. In another example, the management entity may periodically check the access point for up-to-date mapping information. FIG. 10 illustrates an example of a management entity 1001 that receives mapping information from an access point 201 or 202 or a wireless host 210, 211, 220 or 221. The management entity 1001 provides the mapping information to the REF 701.

Figure 11:
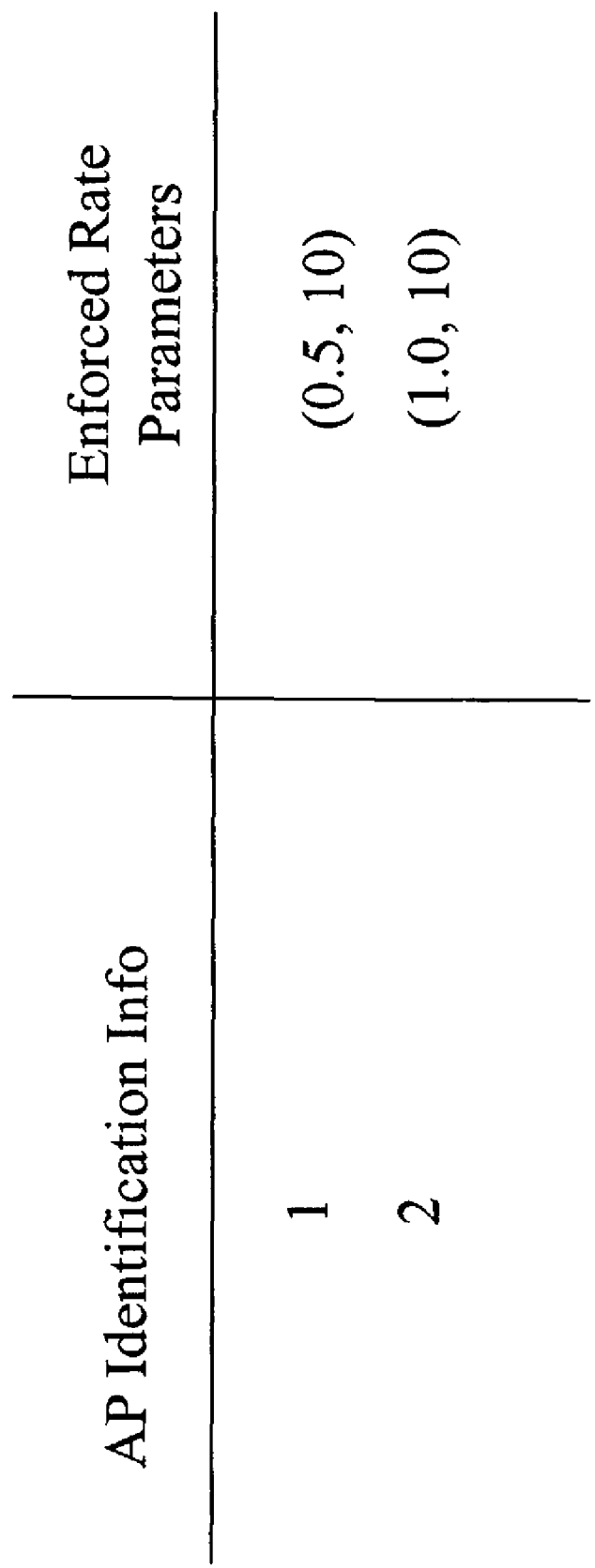
FIG. 11 shows an example of an enforced rate table in accordance with aspects of the present invention

FIG. 7 further illustrates an example of an RDF 720 associated with the REF 701. The RDF 720 maintains the enforced packet rate for each access point. The RDF 720 may contain an Enforced Rate Table 721 containing enforced rate parameters (i.e., rate enforcement parameters) corresponding to an access point. The designated enforced rate parameters may be sent to the REF 701. The enforced rate parameters may include any parameter for enforcing the data rate or any parameter capable of indicating rate control information. These may include but are not limited to the average rate, the burst size or peak rate. The enforced rate parameters may further comprise a Gaussian distribution of peak rates or a sliding/jumping window based approach of bytes per unit time. Additionally, the enforced rate parameters may also include a burst range. However, the invention is not so limited as any parameter for controlling packet rate may be used. FIG. 11 illustrates an example of an Enforced rate table containing enforced rate parameters and corresponding identification numbers for corresponding access points associated with the enforced rate parameters. As illustrated in FIG. 11, the enforced rate parameters may comprise an average rate and/or burst size. However, the enforced rate parameters are not so limited as any parameter associated with packet transmission rate may be used.

Figure 12:
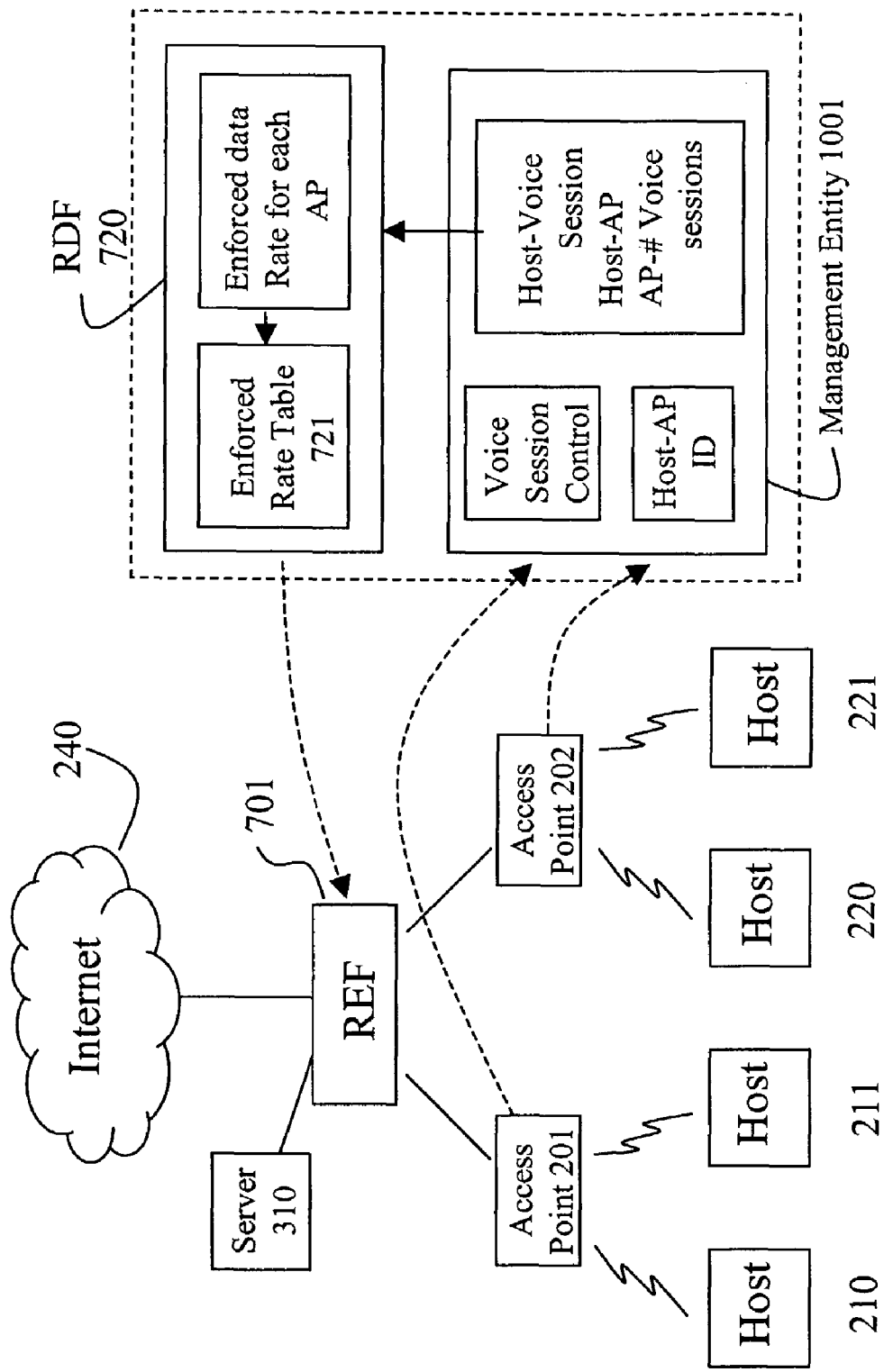
FIG. 12 shows an example of active session information in the RDF in accordance with aspects of the present invention.

The RDF 720 obtains rate control information to determine the enforced rate parameters. The rate control information may be obtained in a variety of ways. For example, the RDF 720 may obtain information from the management entity 1001 as described above. FIG. 12 illustrates an example of the RDF 720 obtaining information on the number of active sessions associated with each access point from the management entity 1001 and determining the enforced rate based on the information received from the management entity 1001. In this example, the management entity 1001 has mapping information of the wireless host and a corresponding access point. This information may be received either from the access point 201 or 202 or the wireless host (210, 211, 220 or 221) as described above and illustrated in FIG. 10. The management entity 1001 further contains information on active voice sessions associated with each wireless host (210, 211, 220 or 221) as well as attributes of the active voice session. The attributes include, for example, coding and bit-rate. This information is provided to the RDF 720 from the management entity 1001. The RDF 720 receives this information and determines the data rate to be enforced for each access point 201 or 202 based on the information. Although FIG. 12 illustrates the RDF 720 to be located at the same device as management entity 1001, the RDF 720 need not be colocated with the management entity but the RDF 720 may be located anywhere including at the REF 701 or as a separate device. The RDF 720 may communicate and share information with the management entity 1001 or the REF 701 through protocols, if necessary.

Figure 13:
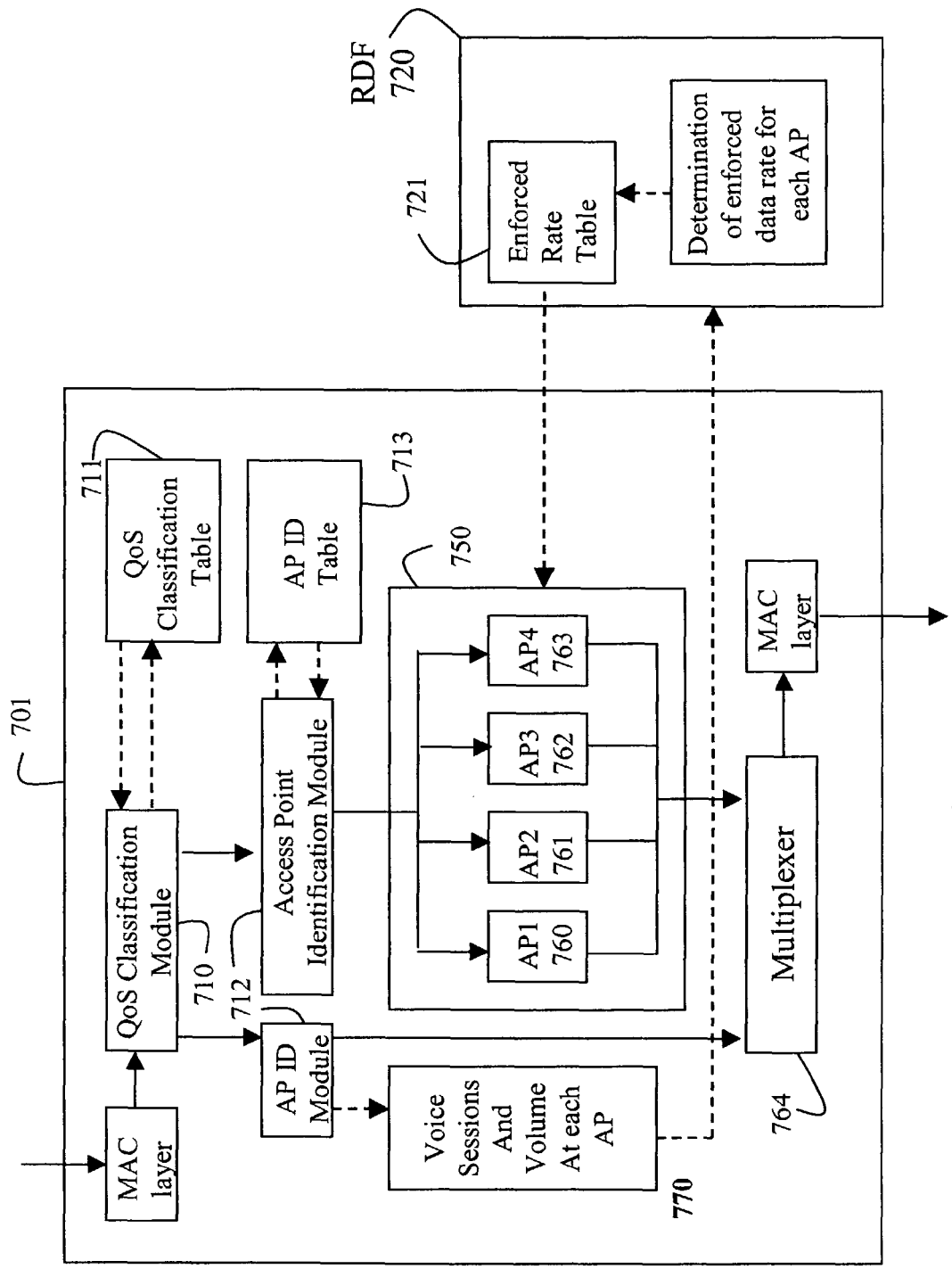
FIG. 13 shows an example of an RDF obtaining information from the REF in accordance with aspects of the present invention.

The RDF 720 may also obtain information from the REF 701 as illustrated by way of example in FIG. 13. The REF 701 accesses the IP layer header of each packet and may thus obtain active voice (more generally, non-enforced) session information. This information may be used by the RDF 720 to determine the rate of the enforced packets for each corresponding access point. The RDF 720 may then obtain the information from the REF 701 and determine the enforced data rate (more generally, rate of enforced packets) for the corresponding access point. In this example, a packet is received at the QoS classification module and is classified as non-enforced or enforced. The QoS classification table 711 is accessed to provide enforced or non-enforced information on the packet which may be based on information obtained in an IP header of the packet. The data packet is associated with an access point at the access point identification module 712 based on mapping information obtained from the access point identification table 713. The number of voice sessions and possibly volume of those voice sessions at each access point may be determined by looking into IP headers and higher layer headers of the non-enforced packets (770). This information may be sent to the RDF 720 for determination of enforced data rate for each access point. The information may be incorporated into the enforced rate table 721 and sent to the rate enforcer 750 to control the data rate for the access point.

As further illustrated in FIG. 7 and FIG. 13, data packet (=enforced packet) is sent from the access point identification module 712 to a rate enforcer 750. The rate enforcer 750 receives enforced rate parameters from the RDF 720 and enforces a packet rate based on a corresponding access point 760, 761, 762, 763. The enforced packets are multiplexed at a multiplexer 764 and are sent to a designated access point such that the designated access point may transmit packets no greater than the enforced rate.

Figure 14:
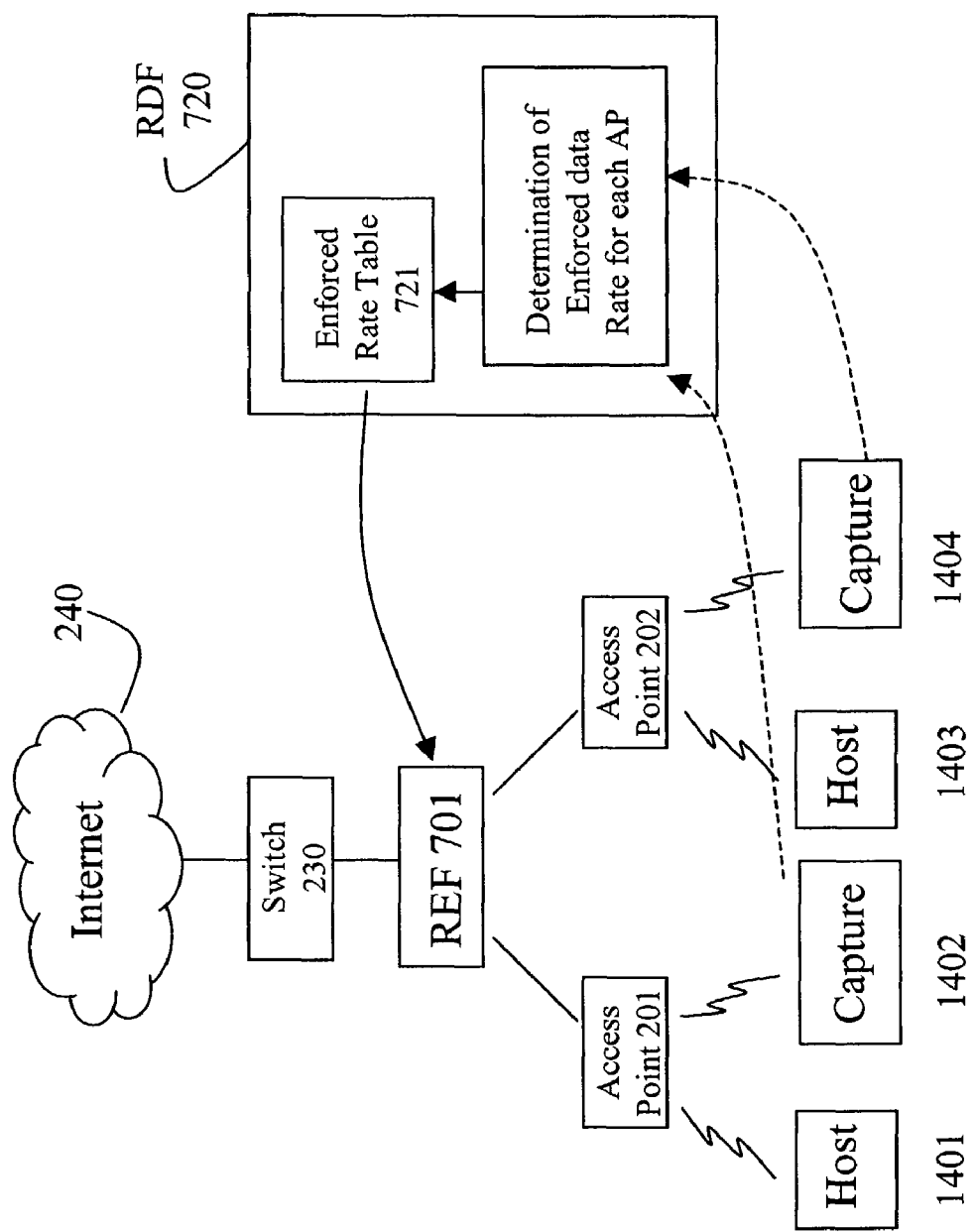
FIG. 14 shows an example of an RDF obtaining information from a wireless host in accordance with aspects of the present invention.

FIG. 14 illustrates another method the RDF 720 may use to obtain the rate control information for determining the packet rate to be enforced for a corresponding access point 201, 202. In this example, a dedicated capture device may be used as a wireless host. This special purpose wireless host 1402, 1404 collects information on wireless traffic as well as on active voice sessions and their traffic volumes. The special purpose wireless host 1402, 1404 may provide the obtained information to the RDF 720 which may then determine the rate to be enforced for corresponding access points 201, 202. Also, the RDF 720 may alternatively obtain information on the QoS status of packets at each access point 201, 202 or wireless host 1401, 1403. This information may include but is not limited to queue length, delay time or loss ratio. The RDF 720 may periodically poll the access points 201, 202 or wireless hosts 1401, 1402, 1403, 1404 for this information or the access points 201, 202 or wireless hosts 1401, 1402, 1403, 1404 may periodically notify the RDF 720 of the information.

The number of wireless hosts attached or associated with an access point that may transmit data packets upstream to the access point may affect the available packet rate for the access point. This uplink data packet rate for the wireless host may be statically determined. Therefore, the downlink enforced data rate may be determined dynamically based on the number of wireless hosts associated with the access point. In this example, the total amount of uplink data traffic is not enforced and therefore, the number of wireless hosts associated with the access point may affect the appropriate downlink packet rate. As an example to illustrate this, if each wireless host is statically configured to transmit data traffic at a maximum allowable rate of 100 kbps, the total amount of uplink data traffic is 100×N, where N is the number of wireless hosts. If the number of wireless hosts increases, and the uplink enforced data rate remains at 100 kbps, then the maximum allowable downlink enforced data rate, which is configured dynamically, may be decreased accordingly. Conversely, if the number of wireless hosts is less, then the maximum allowable downlink enforced data rate is higher. In this way, wireless bandwidth is used more efficiently.

Downlink data transmission is typically greater than uplink data transmission. However, if uplink data transmission increases, the uplink data transmission may contend with voice communication. Uplink rate control may be implemented either through static rate configuration or dynamic rate configuration. In static rate configuration, the uplink enforced data rate for each wireless host may be manually configured based on configuration information from the RDF when the wireless host is connected to the wireless network. The RDF may determine the static data rate and send the information to the wireless host. Thus, the uplink data transmission rate may be controlled based on information from the RDF. Alternatively, the RDF and the wireless host may negotiate a static data rate at which the uplink data transmission rate is enforced.

Figure 15:
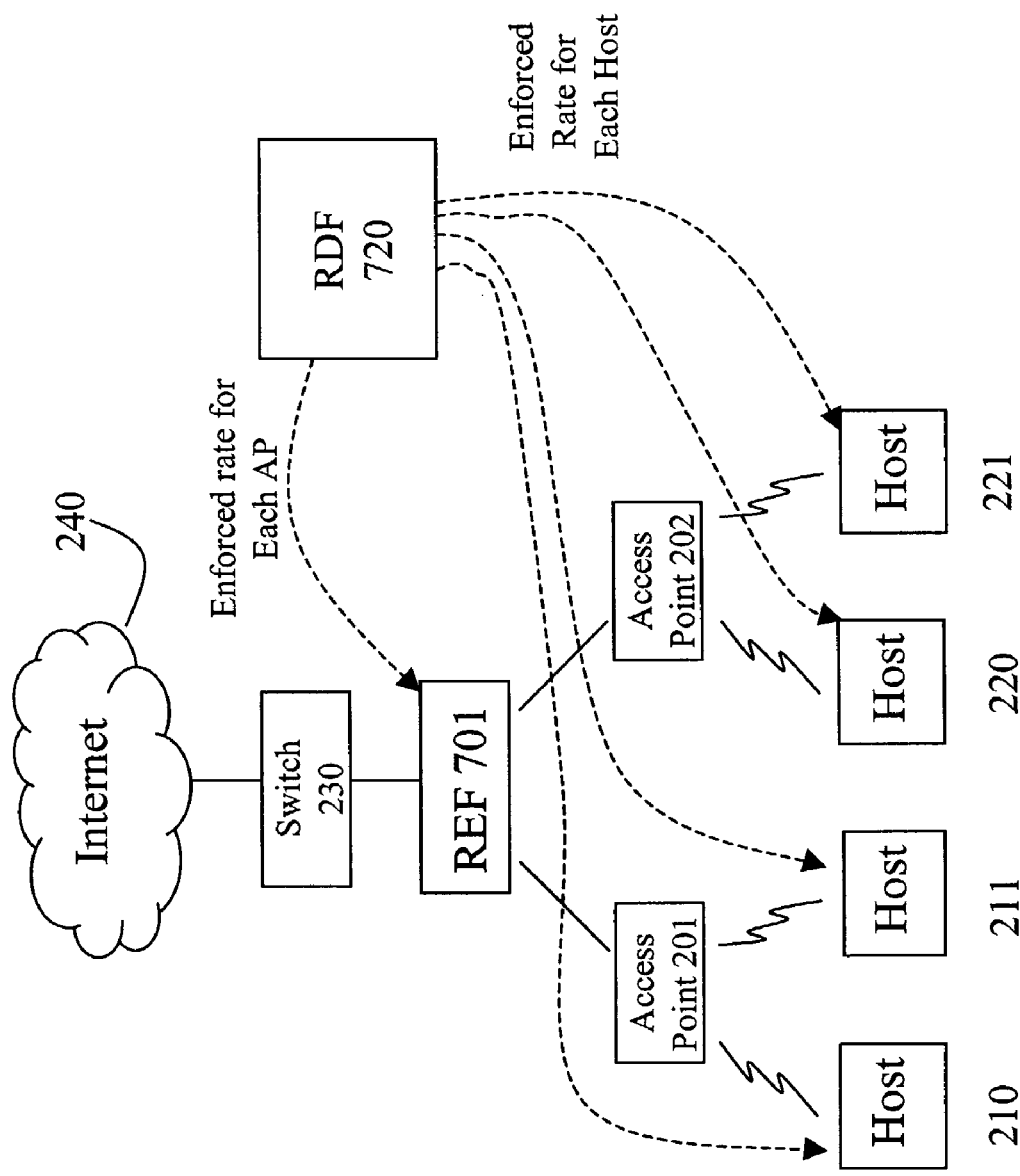
FIG. 15 shows an example of rate enforcement at a wireless host in accordance with aspects of the present invention.

Uplink rate control may also be implemented through dynamic rate configuration. FIG. 15 illustrates an example of rate enforcement at the wireless host 210, 211, 220, 221. Also, rate enforcement may be implemented at the access point 201, 202 as well. In this example, the RDF 720 determines the uplink data rate for each wireless host 210, 211, 220, 221 dynamically and provides this information to each of the wireless hosts 210, 211, 220, 221.

Figure 16:
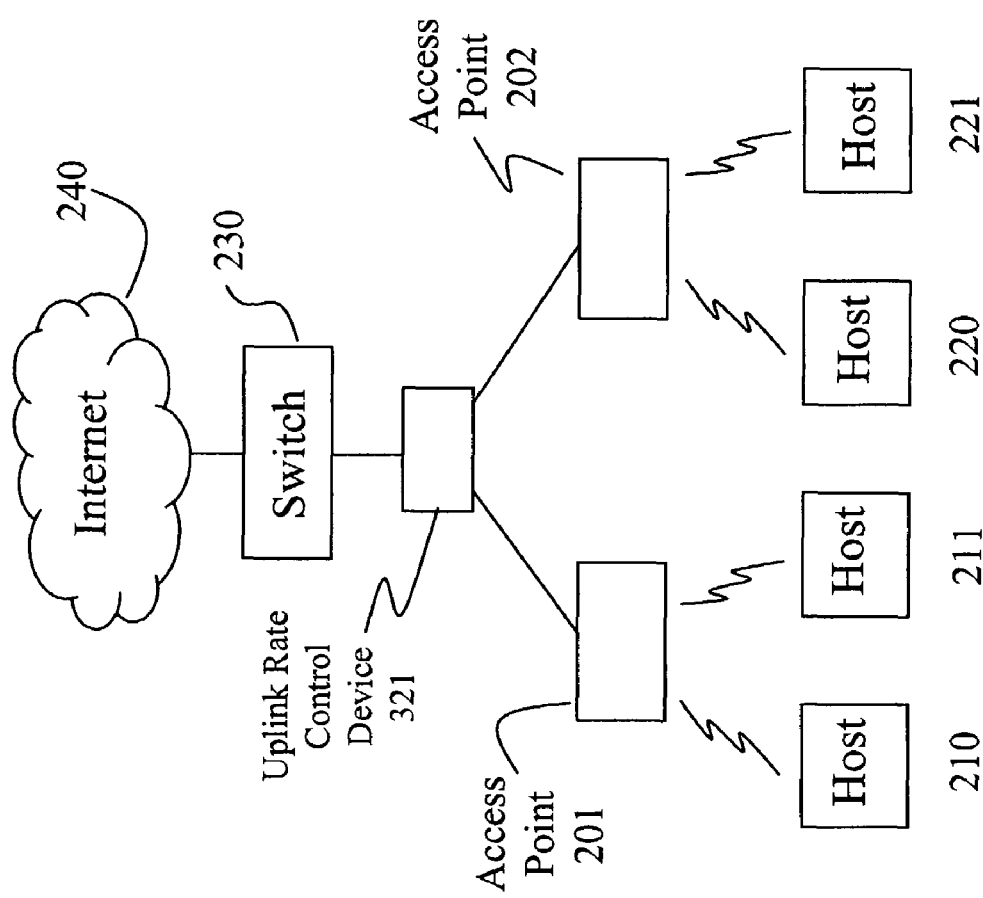
FIG. 16 shows an example of a wireless LAN network in accordance with aspects of the present invention.

Uplink rate control may be implemented as an external function upstream from the access points. This could be in a dedicated box or incorporated into a switch. FIG. 16 depicts an example of the case of a dedicated box as an uplink rate control device 321 supporting multiple access points 201, 202. Furthermore, it may be collocated with a downlink rate control (not shown). Then, uplink packets are classified into enforced and non-enforced packets in the REF similar to the above described method for downlink packets. An enforced rate may be delivered from RDF as well and the rate may be assigned for each Access Point (AP). Since the enforced rate is defined by the AP, the uplink packets from the hosts (210, 211, 220 221) bridged by each AP (201, 202) are throttled at the defined rate. If the packet flows obey a protocol which has a capability to manage its behavior dynamically based on its sensing network condition, uplink packets may be adapted to the throttling rate autonomously. Transport Control Protocol (TCP) is an example of such a protocol. This configuration makes the system design more flexible.

The above example relating to FIG. 16 may be adapted to incorporate rate enforcement by both uplink and downlink packets. The uplink enforcement rate may be configured in relation to downstream rate control and dynamically managed. This may improve bandwidth usage efficiency because the uplink throttling rate and downlink throttling are defined for the AP by the AP. Furthermore, in order to protect non-enforced packets going over a wireless link, it may be possible for the controller to manage only the total throttling rate for downlink enforced packets and uplink enforced packets based on the amount of non-enforced packets. Then, RDF calculates a distribution ratio of the rate for uplink and downlink dynamically to improve the efficiency of available bandwidth usage for enforced packets without degrading a quality of service for non-enforced packets.

Thus, improved quality of service is provided through a novel system and method of transmission rate control in a network. Rate control may be in the downlink or uplink direction and may be statically or dynamically configured. Rate control may be implemented at varying points in the network including but not limited to at the wireless host, at the access point, at a separate device such as a server or a router, or at a separate location within the network. In one example of the present invention, a rate enforcement function is provided for identifying packets to be enforced and identifying mapping between each packet and corresponding access point. Also, a rate decision function is provided for determining the rate to be enforced for each of the access points or each of the wireless hosts.

It is understood that the present invention can take many forms and embodiments. The embodiments shown herein are intended to illustrate rather than to limit the invention, it being appreciated that variations may be made without departing from the spirit or the scope of the invention.

Although illustrative embodiments of the invention have been shown and described, a wide range of modifications, changes and substitutions is intended in the disclosure and in some instances some features of the present invention may be employed without a corresponding use of the other features. Accordingly, it is appropriate that the appended claims be construed broadly and in a manner consistent with the scope of the invention.

What is claimed is:

1. A method for data transmission rate control in a network comprising:
   receiving a packet transmission, said packet transmission including classification data;
   classifying the packet transmission based on the classification data;
   identifying an access point corresponding to the packet transmission;
   determining a data transmission rate based on the access point.

2. The method of claim 1 wherein said step of classifying comprises accessing a classification table, said classification table including classification information.

3. The method of claim 2 wherein said step of classifying comprises determining if the packet transmission is enforced.

4. The method of claim 1 wherein said step of identifying an access point comprises determining information in the packet transmission.

5. The method of claim 4 wherein information in the packet transmission comprises one of an IP address, TOS protocol or DCSP protocol.

6. The method of claim 1 wherein said step of identifying an access point comprises accessing a database, said database including mapping information between a wireless host and an access point.

7. The method of claim 1 wherein the network is a wireless LAN network.

8. The method of claim 1 wherein said step of determining a data transmission rate further comprises receiving host information, said host information including information on corresponding active voice sessions.

9. The method of claim 8 wherein the host information further comprises mapping information between a host and a corresponding access point.

10. The method of claim 9 wherein said data transmission rate is determined based on the number of corresponding active voice sessions.

11. The method of claim 10 wherein the host information is received from a management entity.

12. The method of claim 1 wherein said step of determining a data transmission rate further comprises receiving an IP layer header associated with a data packet, said IP layer header including a destination address and classification information.

13. The method of claim 12 wherein the IP layer header further comprises active voice session information.

14. The method of claim 1 further comprising providing the data transmission rate to an access point.

15. An apparatus for providing a data transmission rate comprising:
- a classification module for classifying a data packet;
- an access point identification module connected to the classification module for mapping a host address with a corresponding access point;
- a rate enforcing module connected to the access point identification module for providing a data transmission rate corresponding to the access point.

16. The apparatus of claim 15 wherein the classification module classifies the data packet as an enforced or non-enforced data packet.

17. The apparatus of claim 16 further comprising a database coupled to the classification module, the database comprising a list of quality of service identification information for at least one data packet.

18. The apparatus of claim 17 wherein the database further comprises a list of enforced or non-enforced classification information corresponding to the quality of service identification information for each data packet.

19. The apparatus of claim 15 further comprising a database coupled to the access point identification module, the database including a list of host address information.

20. The apparatus of claim 19 wherein the database further comprises a list of access point identification information, corresponding to each host address information.

21. The apparatus of claim 20 wherein the host address information comprises one of an IP address or MAC address corresponding to a host.

22. The apparatus of claim 20 wherein the access point identification information comprises one of an access point identifier or MAC address corresponding to an access point.

23. The apparatus of claim 15 further comprising a module for determining an enforced data rate for data transmission.

24. The apparatus of claim 23 wherein the module for determining an enforced data rate comprises a database, said database including access point identification information.

25. The apparatus of claim 24 wherein the database further comprises rate parameters, said rate parameters corresponding to the access point identification information.

26. The apparatus of claim 25 wherein the rate parameters comprise one of average rate or burst size.

27. A system for data transmission rate control in a network comprising:
- a rate determining device for providing a data transmission rate for a network element;
- a rate control device for providing a transmission rate for a data packet to a plurality of network elements;
- wherein the rate determining device includes an enforced rate table, the enforced rate table comprising data rate information corresponding to an access point;
- wherein the rate control device determines a wireless host and access point corresponding to the data transmission and provides the enforced data rate information to the access point.

28. A system for data transmission rate control in a network comprising:
- a rate control device for providing a transmission rate for a data packet to a plurality of network elements;
- a plurality of access points connected to the rate control device for transmitting data at said transmission rate to a host device.

29. The system of claim 28 further comprising a rate determining device connected to the rate control device for providing enforced rate parameters to the rate control device, said enforced rate parameters corresponding to at least one access point.

30. The system of claim 28 wherein the rate control device provides the transmission rate for the data packet to a designated access point based on said enforced rate parameters corresponding to said designated access point.

* * * * *

UNITED STATES PATENT AND TRADEMARK OFFICE
CERTIFICATE OF CORRECTION

PATENT NO. : 8,139,551 B2
APPLICATION NO. : 10/444953
DATED : March 20, 2012
INVENTOR(S) : Yasuhiro Katsube et al.

It is certified that error appears in the above-identified patent and that said Letters Patent is hereby corrected as shown below:

On the title page, Item (75):
        Please correct the residency information for Shinichi Baba from "Irvine, AZ (US)" to --"Irvine, CA (US)--

Signed and Sealed this
Fifteenth Day of October, 2013

Teresa Stanek Rea
*Deputy Director of the United States Patent and Trademark Office*